US010814484B2

(12) United States Patent
Preisinger et al.

(10) Patent No.: US 10,814,484 B2
(45) Date of Patent: Oct. 27, 2020

(54) METHOD, CONTROL SYSTEM AND MOVEMENT SETTING MEANS FOR CONTROLLING THE MOVEMENTS OF ARTICULATED ARMS OF AN INDUSTRIAL ROBOT

(71) Applicant: KEBA AG, Linz (AT)

(72) Inventors: Gernot Preisinger, Linz (AT); Manfred Schininger, Linz (AT)

(73) Assignee: KEBA AG, Linz (AT)

( * ) Notice: Subject to any disclaimer, the term of this patent is extended or adjusted under 35 U.S.C. 154(b) by 80 days.

(21) Appl. No.: 15/771,461

(22) PCT Filed: Oct. 28, 2016

(86) PCT No.: PCT/EP2016/076042
§ 371 (c)(1),
(2) Date: Jun. 14, 2018

(87) PCT Pub. No.: WO2017/072281
PCT Pub. Date: May 4, 2017

(65) Prior Publication Data
US 2018/0354130 A1    Dec. 13, 2018

(30) Foreign Application Priority Data
Oct. 30, 2015    (DE) .................. 10 2015 221 337

(51) Int. Cl.
*G06F 17/00*    (2019.01)
*B25J 9/16*    (2006.01)
(Continued)

(52) U.S. Cl.
CPC ........... *B25J 9/1664* (2013.01); *B25J 9/1656* (2013.01); *B25J 9/1694* (2013.01); *G05B 19/409* (2013.01);
(Continued)

(58) Field of Classification Search
CPC ...... B25J 9/1664; B25J 9/1656; B25J 9/1694; G05B 19/409; G05B 19/423; G05B 19/427; G05B 2219/36436; G05B 2219/36452
(Continued)

(56) References Cited

U.S. PATENT DOCUMENTS 4,283,764 A    8/1981  Crum et al.
5,768,125 A    6/1998  Zinger et al.
(Continued)

FOREIGN PATENT DOCUMENTS

CA    2 448 203 A1    11/2002
CA    2 448 389 A1    11/2002
(Continued)

OTHER PUBLICATIONS

International Search Report of PCT/EP2016/076042, dated Jan. 31, 2017.
(Continued)

*Primary Examiner* — Ronnie M Mancho
(74) *Attorney, Agent, or Firm* — Collard & Roe, P.C.

(57) ABSTRACT

The invention relates to a method for controlling the movements of articulated arms (21, 22, 23) of an industrial robot (2) using a movement setting means (3) to be guided by hand by an operator, the movements of which are provided for generating at least a portion of the movement control data for the industrial robot (2) to be controlled. At least one of a plurality of reference marks (19, 19', 19") is arranged or formed at least on individual articulated arms (21, 22, 23) adjustable by the operator. The movement setting means (3) comprises at least one imaging and/or at least one distance-sensitive sensor (16, 17) which at least one sensor (16, 17) can be set with at least one of the plurality of reference marks (19, 19', 19") into a relative spatial position selected (Continued)

Figure 1:
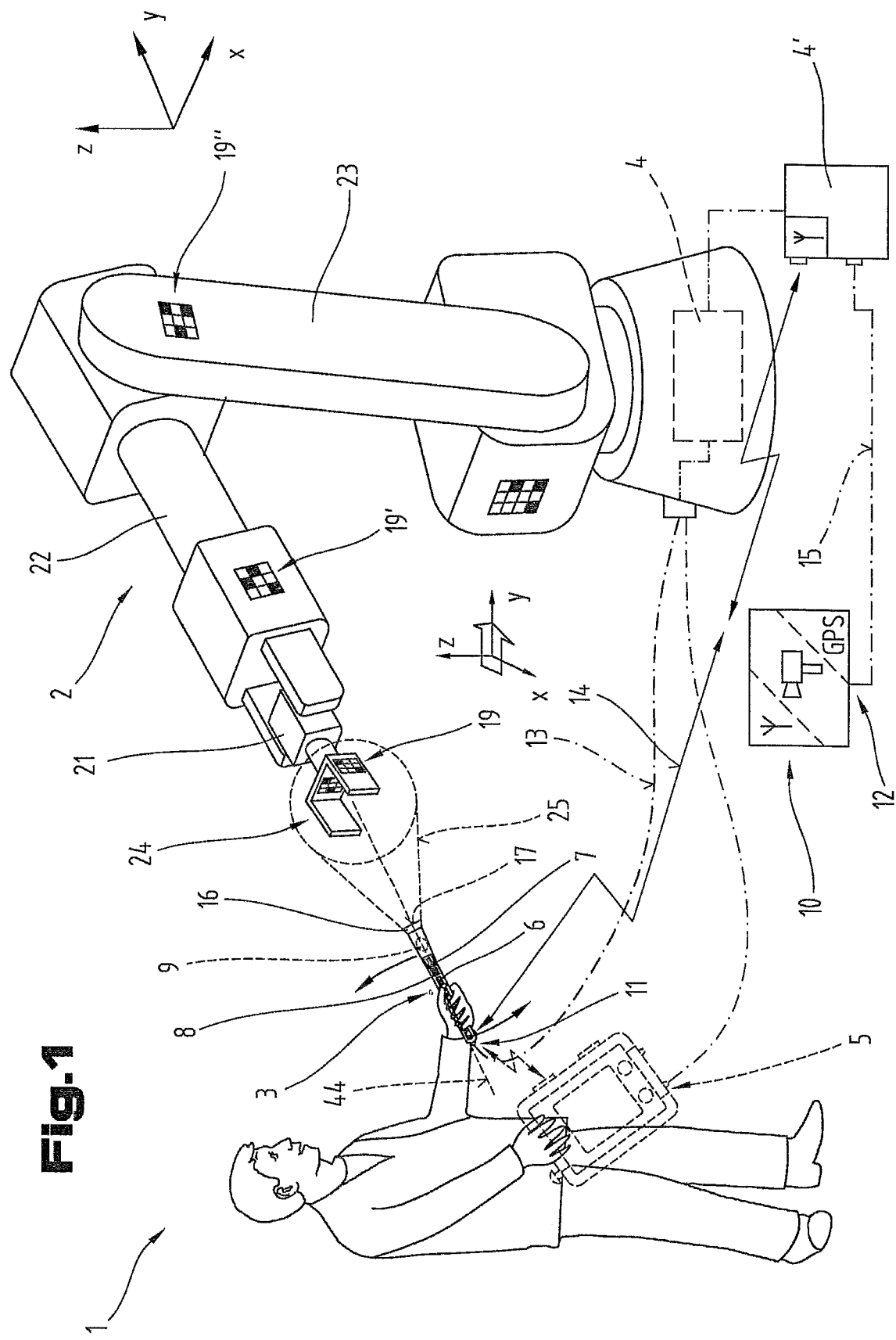

by the operator. During a movement of the movement setting means (3) at least the articulated arm (21, 22, 23) bearing the respectively selected reference mark (19, 19', 19") follows the movements of the movement setting means by control technology. In addition, a corresponding control system (1) and movement setting means (3) are specified.

27 Claims, 4 Drawing Sheets

(51) Int. Cl.
   *G05B 19/409* (2006.01)
   *G05B 19/423* (2006.01)
   *G05B 19/427* (2006.01)

(52) U.S. Cl.
   CPC ......... *G05B 19/423* (2013.01); *G05B 19/427* (2013.01); *G05B 2219/36436* (2013.01); *G05B 2219/36452* (2013.01)

(58) Field of Classification Search
   USPC .......................................................... 700/245
   See application file for complete search history.

(56) References Cited

U.S. PATENT DOCUMENTS

| | | | |
|---|---|---|---|
| 6,385,508 B1 | 5/2002 | McGee et al. | |
| 6,717,382 B2* | 4/2004 | Graiger | G08C 17/02 |
| | | | 318/568.11 |
| 7,219,064 B2 | 5/2007 | Nakakita et al. | |
| 7,713,205 B2 | 5/2010 | Fu et al. | |
| 8,010,180 B2* | 8/2011 | Quaid | A61B 17/1703 |
| | | | 600/424 |
| 8,012,107 B2* | 9/2011 | Einav | A61B 34/30 |
| | | | 601/5 |
| 8,169,468 B2 | 5/2012 | Scott et al. | |
| 8,177,732 B2* | 5/2012 | Einav | A61H 1/0274 |
| | | | 601/5 |
| 8,228,368 B2 | 7/2012 | Zhao et al. | |
| 8,344,848 B2* | 1/2013 | Moschl | G05B 19/4184 |
| | | | 318/568.11 |
| 8,803,955 B2 | 8/2014 | Scott et al. | |
| 8,810,631 B2 | 8/2014 | Scott et al. | |
| 9,079,317 B2* | 7/2015 | Preisinger | B25J 13/06 |
| 9,775,499 B2 | 10/2017 | Scott et al. | |
| 9,958,862 B2* | 5/2018 | Kapoor | G05B 19/427 |
| 10,524,644 B2 | 1/2020 | Scott et al. | |
| 10,603,127 B2 | 3/2020 | Hasser et al. | |
| 2002/0192075 A1 | 12/2002 | Block | |
| 2004/0186623 A1 | 9/2004 | Dooley et al. | |
| 2005/0240309 A1 | 10/2005 | Bischoff | |
| 2007/0021738 A1 | 1/2007 | Hasser et al. | |
| 2009/0270678 A1 | 10/2009 | Scott et al. | |
| 2010/0183196 A1 | 7/2010 | Fu et al. | |
| 2011/0160589 A1 | 6/2011 | Fu et al. | |
| 2017/0128041 A1 | 5/2017 | Hasser et al. | |
| 2017/0128144 A1 | 5/2017 | Hasser et al. | |

FOREIGN PATENT DOCUMENTS

| | | |
|---|---|---|
| CN | 1398214 A | 2/2003 |
| CN | 1529838 A | 9/2004 |
| CN | 101193603 A | 6/2008 |
| CN | 101252886 A | 8/2008 |
| CN | 102076259 A | 5/2011 |
| DE | 30 38 466 A1 | 4/1981 |
| DE | 10 2007 014497 A1 | 10/2008 |
| DE | 10 2012 010721 A1 | 12/2013 |
| DE | 10 2014 200066 A1 | 7/2015 |
| EP | 0 778 610 B1 | 7/2002 |
| EP | 1 588 806 A1 | 10/2005 |
| EP | 2 012 208 A2 | 1/2009 |
| EP | 2 055 446 A1 | 5/2009 |
| EP | 2 481 529 A1 | 8/2012 |
| EP | 2 483 039 B1 | 8/2015 |
| JP | H02-262988 A | 10/1990 |
| JP | H02-279289 A | 11/1990 |
| JP | 2003-231078 A | 8/2003 |
| KR | 2013 0000496 A | 1/2013 |
| WO | 2008/116595 A2 | 10/2008 |
| WO | 2011/039429 A1 | 4/2011 |
| WO | 2011/150440 A2 | 12/2011 |
| WO | 2011/153569 A1 | 12/2011 |
| WO | 2011/153570 A1 | 12/2011 |
| WO | 2013/033747 A1 | 3/2013 |
| WO | 2015/104273 A1 | 7/2015 |

OTHER PUBLICATIONS

English translation of the Chinese Office Action dated Mar. 25, 2020 in Chinese Application No. 201680073454.9.

* cited by examiner

METHOD, CONTROL SYSTEM AND MOVEMENT SETTING MEANS FOR CONTROLLING THE MOVEMENTS OF ARTICULATED ARMS OF AN INDUSTRIAL ROBOT

CROSS REFERENCE TO RELATED APPLICATIONS

This application is the National Stage of PCT/EP2016/076042 filed on Oct. 28, 2016, which claims priority under 35 U.S.C. § 119 of German Application No. 10 2015 221 337.4 filed on Oct. 30, 2015, the disclosure of which is incorporated by reference. The international application under PCT article 21(2) was not published in English.

The invention relates to a method for controlling the movements of articulated arms of an industrial robot, a control system for implementing the corresponding control process, as well as a movement setting means which can be used in such a control system, as specified in claims 1, 24 and 26.

In the prior art it is common to use handheld operating devices with buttons or a joystick to teach the positions of robots, in particular industrial robots, by means of which the robot itself or individual axes of its articulated arms can be operated. In this process individual points on the corresponding trajectory can be saved, so that in subsequent automatic operation the respective trajectory can be repeated many times.

An additional way of teaching or programming robot movements is to directly guide the robot by hand. According to a first embodiment the end effector of the robot is simply gripped by hand and moved to the desired position. According to a second embodiment, grips can be coupled mechanically to the robot and the activation force of the operator is evaluated, for example by a highly precise force or torque measurement, and is used to control or regulate the position of the robot. Said embodiments have the disadvantage in terms of safety that the operator has to stand very close to the robot or may even have stand partly underneath the moving aims of the robot. If the robot makes a driving error or there is a calculation error or other fault in its control device the robot can still cover a relatively large distance at a much higher speed until usually a safety monitoring system brings it to a halt. However, this may possibly cause injury to a person in the immediate area. In addition, in the second embodiment the difficulty of providing a sufficiently stable mechanical coupling on the robot has to be overcome which requires intervention in the mechanism or support structure of the robot. The frequent and rapid reconnection of the point of action on the robot is thus also difficult and not very user-friendly.

EP2055446A1 describes a handheld operating device with integrated inertial sensors, by means of which linear and rotational accelerations of the handheld operating device are detected, from which linear and rotational relative movements can be calculated and any movement changes of the handheld operating device are converted while pressing an enable button either 1:1, or also scaled, and in real time, i.e. essentially immediately into a corresponding robot movement. According to the embodiments in this document the movements of the handheld operating device always influence the movements of the end effector or the gripper or the tool of the robot.

DE102012010721A1A is a further known document. The embodiment disclosed in the latter is not only limited to use with robots, but can be used in general for moving machines or machine parts, such as for example a printing machine or a print roller. As a handheld operating device a wirelessly connected device is proposed in the form of a Tablet or Smartphone. A virtual movement coupling between the handheld operating device and the machine can be performed for one or more degrees of freedom. It is not apparent from said document how such a concept can be implemented as practically as possible.

U.S. Pat. No. 6,385,508B1 describes an electromechanical grip for guiding a robot. In particular a two-handed grip is provided, by means of which a mechanically secure connection is formed with the robot and by means of which two-handed grip the robot or its end effector can be moved by an operator into a desired position and orientation. The mechanical connection between said grip, which is used with both hands, and the robot comprises on the one hand a fixed connection point to the robot and in addition an articulated connection point between said fixed connection point and the two-handed grip for the operator. In this way relative variations in the orientation and position of the two-handed grip can be balanced out while teaching the robot. The articulated connection point is configured such that only forces can be transmitted according to three degrees of freedom, in particular only forces in x/y/z direction and no torques. Therefore, a simpler sensor system than a 6D force or torque sensor system is described as an advantage and by switching the robot control or the movement mode it is possible to change either the position of the TCP with consistent tool orientation, or in a different case to only change the tool orientation in a consistent position. The guiding grip can be fixed in different positions on the robot and the respective fixing position can be varied during the teaching process. For this in particular a magnetic securing of the guiding grip to the robot is taught.

Further embodiments for achieving the simplest possible hand control or intuitive, hand-guided programming of industrial robots are known from WO2011/150440A2, WO2011/153569A1, WO2011/153570A1 and WO2013/033747A1, which documents are all in the name of the applicant of the present application.

The objective of the present invention was to overcome the disadvantages of the prior art and to provide a method or a device, by means of which a user is able to undertake the simple and intuitive programming or implementation of adjusting movements of a machine, in particular an industrial robot.

Said objective is achieved by a control method, a control system and a movement setting means according to the claims.

In the method or system according to the invention for controlling the movements of the articulated arms of an industrial robot or for controlling the movements of adjustable machine parts of another multiaxial machine, a movement setting means to be operated by hand by an operator is provided, the movements of which are provided for generating at least a portion of the movement control data for the machine to be controlled or the industrial robot to be controlled. The hand guiding of the movement setting means involves both free guiding in space and also a relative adjustment or deviation of a portion of the movement setting means relative to a fixed or detachably mounted portion of the movement setting means. The movement setting means is hereby coupled by data-technology to at least one stationary control device and the at least one control device is designed at least for the activation and deactivation of movement drives of the machine or industrial robot. At least one of a plurality of reference marks is arranged or formed at least on individual machine parts or articulated arms adjustable by the operator. The movement setting means has at least one imaging and/or at least one distance-sensitive sensor, which at least one sensor can be moved by at least one of the plurality of reference marks into a relative spatial position selected by the operator. In a first or initial step using image-based and/or distance-based data from the relative position between the movement setting means and the respective reference mark a fixed coupling condition or an articulated coupling condition with a specific degree of freedom is defined or set. In a following step during a movement of the movement setting means the machine part bearing the selected reference mark, in particular the respective articulated arm or the respectively required articulated arms of the industrial robot, is tracked by control technology such that within the technical limits of the machine or the machine part, in particular within the technical limits of the connected industrial robot, the coupling condition set in the first step is maintained or at least approximately maintained.

According to the invention thus a type of virtual or semi-mechanically connectable gripping or movement setting means is provided for hand-guiding industrial robots. The gripping means or the corresponding movement setting means can here comprise a gripping or activation button, and possibly a short rod for extending the distance. By holding or supporting the end of the rod or movement setting means at intended points of the industrial robot or also the workpiece, where this has to be performed within specific tolerances, and in addition the gripping button is activated, the robot or individual articulated arms can be coupled virtually to the movement setting means. With each additional movement the corresponding action point of the robot or the industrial robot per se can automatically follow the movements of the movement setting means, as though there were a fixed mechanical coupling with the industrial robot. The industrial robot thereby attempts by means of its control device to keep constant or track as far as possible the distance or orientation between the action or contact point and the movement setting means, for example relative to its end or detection point. Said tracking can be performed according to one preferred embodiment as long as the gripping or activation button is activated by the operator.

The measures according to the invention facilitate the simple and intuitive programming or execution of movements of a machine, in particular an industrial robot. In particular, in this way it is possible to avoid having to think in terms of coordinate systems or spatial directions and having to take into account the line of vision of the operator relative to the industrial robot, in particular with regard to views from the front, rear or side. A particular advantage is also that by means of the very simple and intuitive option of selecting individual, movable machine parts or articulated arms the initial training on how to use the control system can be simplified. Also operating errors relating to the desired direction of movement or the erroneous activation of movements of a not required or not desired articulated arm of the industrial robot can be avoided in this way. In addition, the number of operating buttons or the number of multiaxial operating elements, such as e.g. joysticks, for initiating the respective movement commands can be reduced, which is advantageous with regard to the overview and size of the corresponding control systems.

The measures according to claim 2 are also advantageous, as in this way the detection of the respective spatial position and/or orientation or the so-called pose of the movement setting means in space can be performed particularly precisely and reliably according to the environmental conditions or according to the required detection dynamics. Here for example by combining the internal sensor system and external sensor system with reference to the movement setting means a highly accurate determination of the pose can be obtained, which as far as possible is free of the impact of drift. By using the data of the imaging and/or distance-sensitive sensor on the movement setting means in a simple and reliable manner it is possible to establish sufficiently exactly and reliably a variation initiated by the user of the pose of the movement setting means or its gripping section relative to the known position of the respectively selected or assigned reference mark. Also the extent of such deviations in the form of translatory and/or rotary adjustments of the movement setting means relative to the respectively selected reference mark can be detected optimally by distance-sensitive or imaging sensors.

The measures according to claim 3 are also advantageous, as in this way a movement coupling is provided which is clearly traceable for the operator between the movement setting means and the machine to be controlled or the virtually coupled machine part. In particular, in this way a clear, visual comparison can be made between setting the movement and executing the movement by the correspondingly controlled machine. Such fixed coupling conditions are naturally subject to certain limitations, such as with respect to the respective kinematics and movement dynamics of the controlled machine or the controlled industrial robot.

An embodiment according to claim 4 is also advantageous as it provides an improved embodiment in terms of the ergonomic guiding of the movement setting means. For example when making relatively far-reaching linear adjustments of a machine part or the end effector of an industrial robot the operator can still remain in one place whilst the end effector performs relatively far-reaching adjustment movements.

By means of the measures according to claim 5 it is possible to preset selectively a diverse intervention or control behavior and furthermore the discrepancy between the settings of the operator and the final movements of the control device or the industrial robot can be minimized as far as possible.

The measures as claimed in claim 6 are also advantageous, as in this way an industrial robot can be guided for example such that its end effector or the respectively selected articulated arm either only performs translatory movements or only performs rotary movements, for example around the TCP. Or the end effector remains still and only the position of an elbow joint of the industrial robot is changed. In this way it is possible to considerably simplify the guiding of the movement setting means for the operator, as it is not necessary to guide the movement setting means absolutely precisely. By separating into working directions or filtering in relation to translatory or rotary movements also any unwanted adjustments of the industrial robot can be avoided.

By means of the measures according to claim 7 the safety of the control system can be increased in a simple and effective manner. In particular, in this way the unintentional triggering of movements of the industrial robot can be avoided.

The measures as claimed in claim 8 are also advantageous, as by means of the latter a simple and extremely intuitive manner of selecting a machine part or articulated arm for a movement or change in position can be achieved or provided. In addition to simply selecting the machine part provided for an adjustment or change in position the virtual action point of the movement setting means can be designed to carry out an intuitive adjustment of the previously selected machine part or articulated arm. Furthermore, the respective measures can be implemented relatively easily and inexpensively in terms of the required components. The corresponding selection process can thereby include a preceding or following operation in the form of pressing a button on the movement setting means. However, this is not absolutely necessary as in principle the simple detection of a selected reference mark on the respectively desired machine part or articulated arm provided for movement is sufficient.

The measures according to claim 9 are also advantageous as by means of the latter the respective reference mark functions as a data carrier and/or as a linking means to a data set, in order to thus execute the respective control sequences in a simplified manner and in an optimum manner with respect to the usage processes.

By means of the measures according to claim 10 on the one hand the ergonomics can be increased for the user and on the other hand also errors and incorrect assumptions by the operator can be reliably avoided.

The measures according to claim 11 are also advantageous as in this way information or data are made available which make it considerably easier for the user to evaluate the control sequences or the respective current states.

The measures according to claim 12 are also advantageous as by means of the latter the structure of a coupling condition is performed deliberately or initiated by the user and thus errors or operating errors can be excluded.

The measures according to claim 13 are also advantageous, as in this way unpractical or unfavorable positions in terms of the virtual couplings can be filtered out or suppressed. In this way the respectively achievable precision of the control or ergonomics is as high as possible. The adoption of disadvantageous positions in terms of the safety of the operator can be counteracted in this way.

Also by way of the measures according to claim 14 as far as possible the most ideal coupling conditions or virtual coupling relationships can be created and disadvantageous or critical coupling conditions can be prevented or at least identified.

When using a camera unit as an imaging sensor as specified in claim 15, in an advantageous manner in this way in a relatively short period a large amount of information can be recorded or detected and by means of corresponding object recognition or standard evaluation algorithms it is possible to reliably detect information or data. In particular in this way angular adjustments and also translatory relative adjustments relative to a targeted or detested reference mark can be easily recognized and evaluated with relatively high resolution.

Distance-based sensors or sensors with a limited detection area, as specified in claim 16, have the advantage that all the distances can be automatically hidden which are outside a defined distance area or above a defined distance threshold. Furthermore, such distance-sensitive sensors can be implemented inexpensively and relatively easily.

Reference marks which can be produced easily and inexpensively are specified in claim 17. In particular, it is possible in a simple manner to attach, for example adhere or attach in another way, such reference marks on the respective machine parts or articulated arms for the movement or relative adjustment of an industrial robot.

Measures according to claim 18 are also advantageous as in this way three-dimensional objects are created, by means of which the respective movement control, in particular the detection of the respective relative spatial position can be simplified or facilitated.

The measure as claimed in claim 19 is also advantageous, as in this way the targeting or selection of a reference mark from a plurality available reference marks can be facilitated or made as intuitive as possible. In particular, in this way in the manner of a pointing operation the control-technical selection of a desired reference mark or the associated machine part can be performed relatively easily and rapidly and with a high degree of error-security. Furthermore, in this way single-handed operation is possible for the operator.

Also the measures according to claim 20 are particularly advantageous, as in this way the degree of achievable personal safety can be increased considerably. In particular, by means of the distance-associated, virtual coupling of the movable machine part there can be a sufficient distance between the operator and the correspondingly moved machine part. In this way it is possible to prevent injury caused by the inattention of the operator or also by any malfunction or miscalculations of the control devices.

By means of the measures according to claim 21 various system behaviors can be modelled in a simple manner and thus the interaction between a user and the respective machine part can be improved or facilitated. In particular, in this way despite the virtual coupling or connection between the movement setting means and the correspondingly moved machine part as far as possible a natural movement or movement guiding can be supported or facilitated. In particular, by means of such modelling any trembling or abrupt movements of the movement setting means can be damped in terms of their effect on the robot movement, so that the positioning can be performed sensitively and precisely.

An embodiment according to claim 22 is also advantageous as in this way the precision of the user-side machine or robot guiding can be improved. For example in this way any trembling movements of the operator can be prevented on the basis of the movement setting means supported relative to the machine or the industrial robot. The effective suppression of trembling is also achieved even with slow movements of the movement setting means, as the movement setting means is supported or can be supported at least temporarily or at least partly on the correspondingly moved machine part. In addition, by means of the haptic feedback from the machine part via the movement setting means in the direction of the operator as far as possible a harmonious or intuitive movement can be carried out. In particular, by means of the direct movement contact between the movement setting means or the operator and the industrial robot it is possible to react relatively rapidly to undesirable movements, or in this way a type of control loop can be created between the industrial robot or its control device and the operator.

The measures according to claim 23 are also particularly advantageous, as in this way there is haptic feedback to the operator whilst the corresponding articulated arm moves according to the movement settings of the movement setting means or whilst a plurality of articulated arms of the industrial robot move according to the movement settings of the movement setting means. Here by reading or detecting a reference mark, which is attached to the corresponding machine part or articulated arm, in an intuitive and relative error-secure manner the corresponding virtual coupling between the movement setting means and the industrial robot or the desired articulated arm can be established. In addition, in this way the relative adjustment of the movement setting means initiated by the operator relative to the selected reference mark can be converted clearly and unambiguously into corresponding control or movement commands for the industrial robot or the respective articulated arm.

The invention also relates to a control system and a movement setting means, as defined in claims 24 to 27. The corresponding embodiments also address the aforementioned problems. The technical advantages and advantageous effects achievable by means of the solutions according to the invention can be taken from the description above and are also described below.

For a better understanding of the invention the latter is explained in more detail with reference to the following embodiments represented in the figures.

Figure 2:
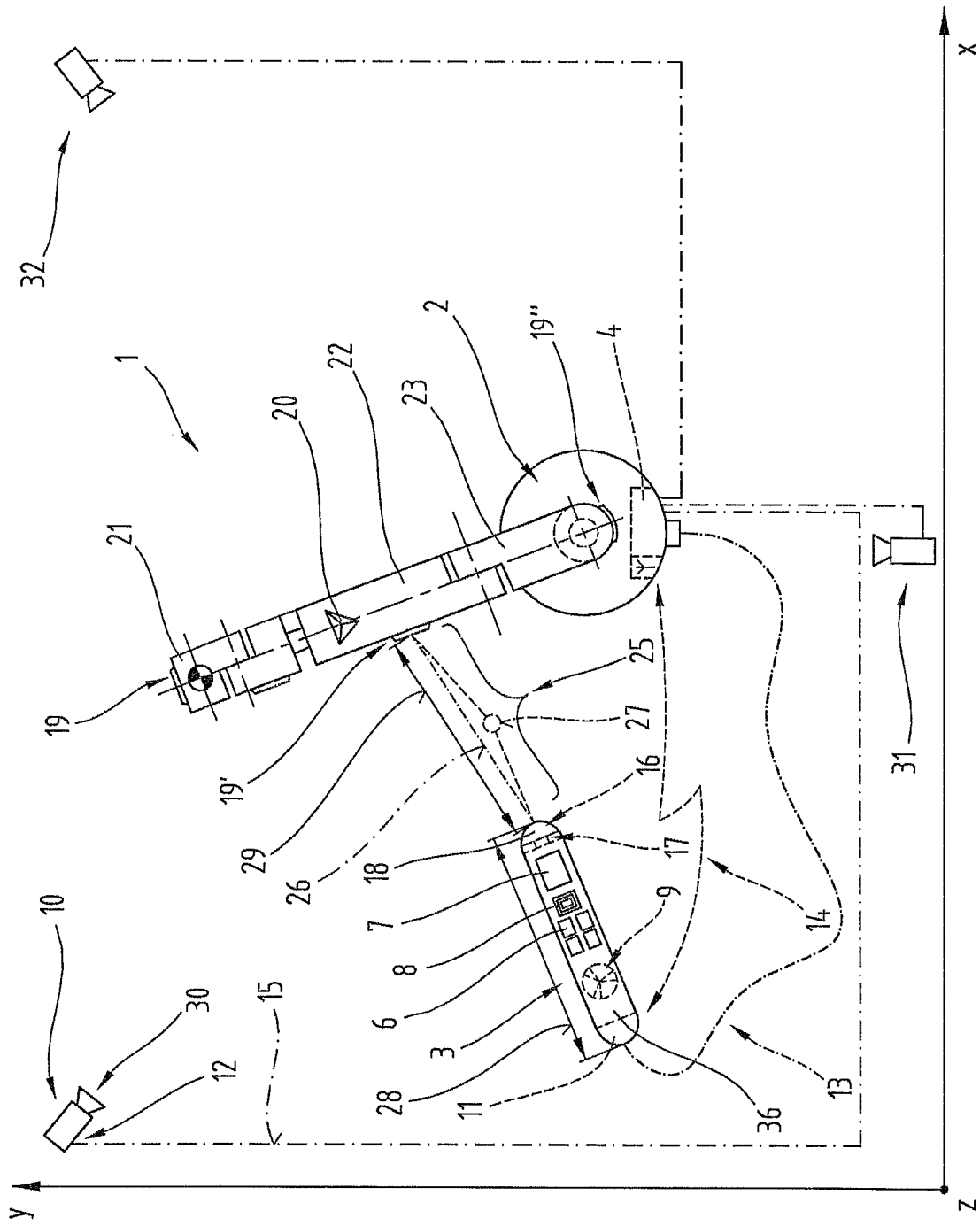
Figure 3:
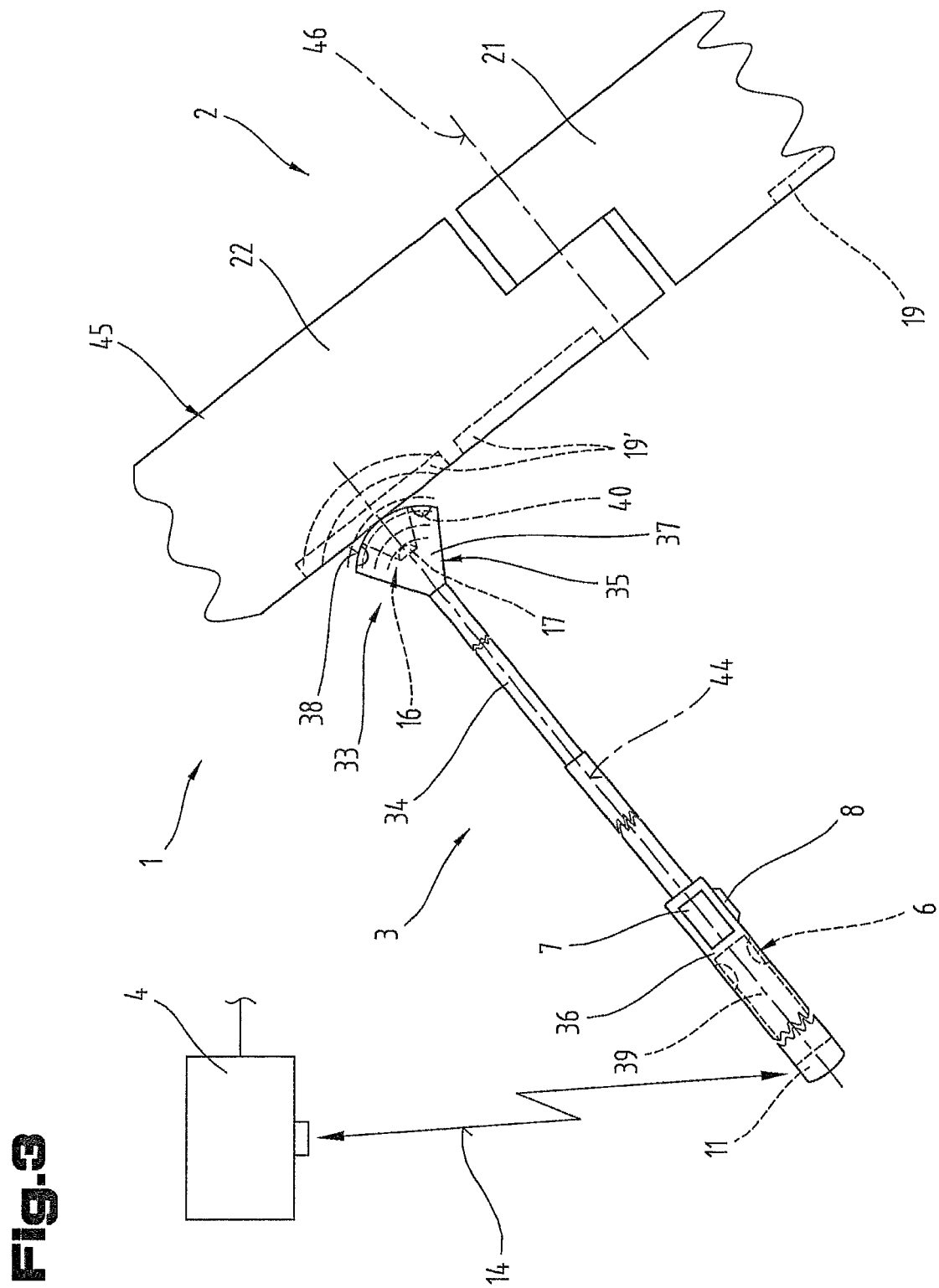
Figure 4:
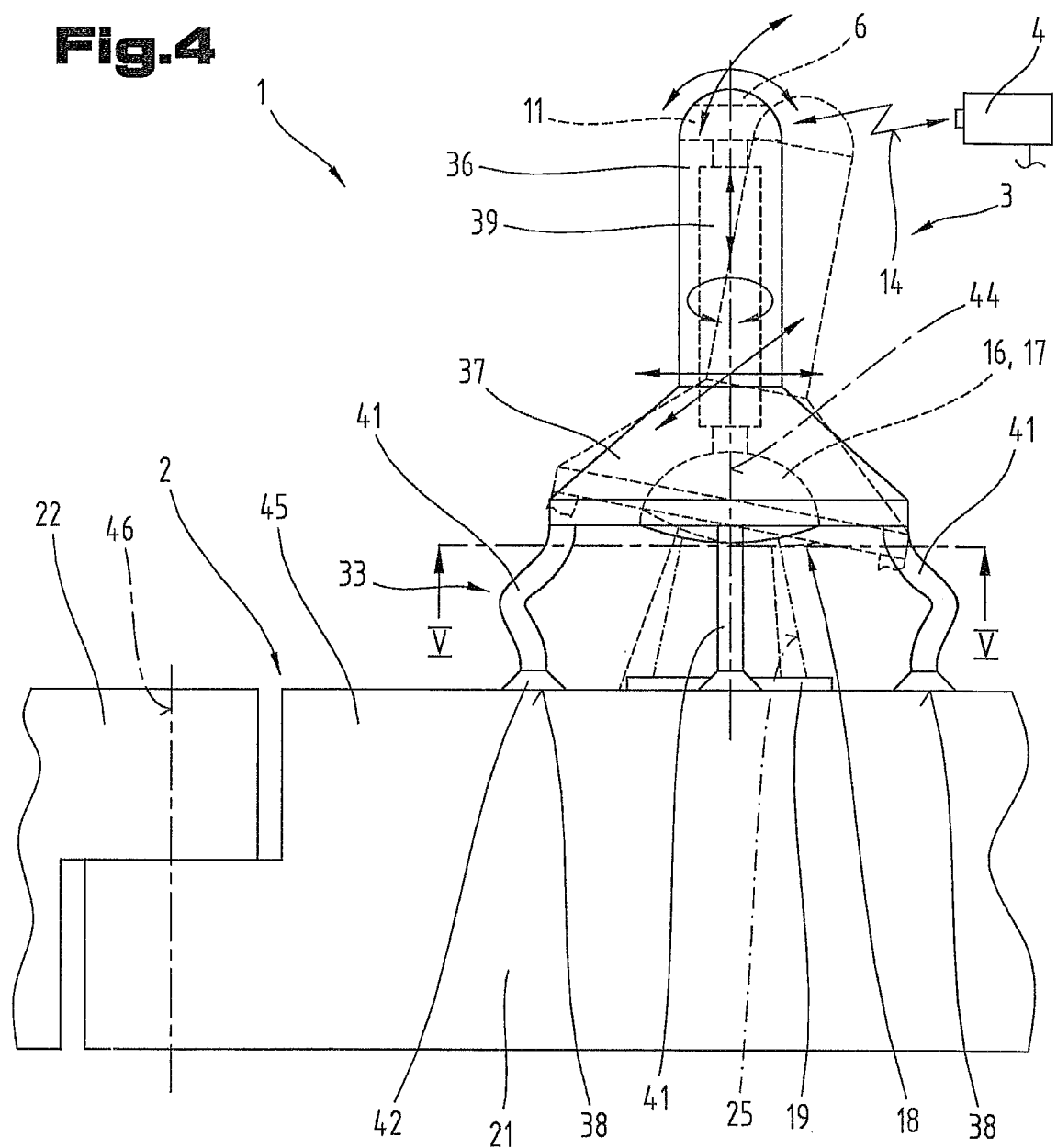
Figure 5:
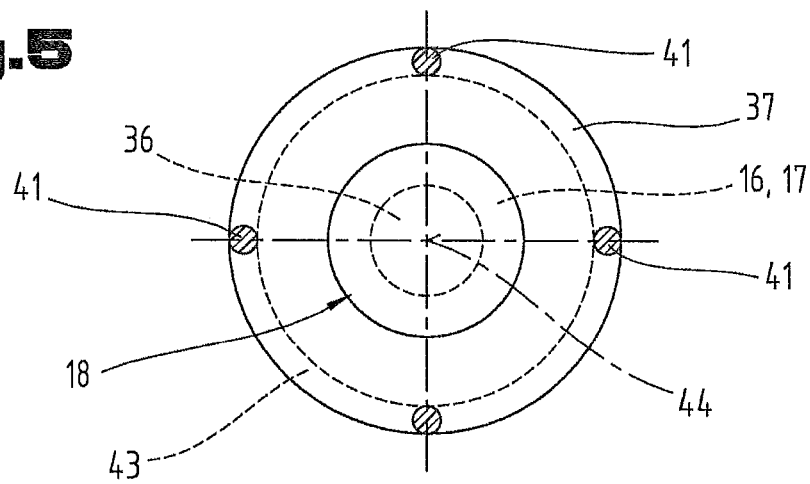

In a much simplified, schematic representation:

FIG. 1 shows an embodiment of a control system for an industrial robot, in which a movement setting means to be operated by hand is used to generate control instructions for the industrial robot, FIG. 2 shows a schematic diagram to illustrate a further embodiment of a virtual coupling between a movement setting means to be operated by hand and a multi-axial industrial robot comprising a plurality of articulated arms which can be adjusted and moved independently of one another, FIG. 3 shows a further embodiment of a movement setting means to be operated by hand by an operator for the selective, control-technical coupling of the articulated arms of an industrial robot, which movement setting means is provided for the load-transferring support or for the mechanical contact relative to the controllable and movable articulated arm of the industrial robot, FIG. 4 shows an additional embodiment of a movement setting means to be operated by hand for the selective, control-technical coupling of the articulated arms of an industrial robot, which movement setting means is provided for the load-transferring support or mechanical contact relative to the controllable and movable articulated arms of the industrial robot, FIG. 5 shows a cross-section of the movement setting means according to FIG. 4, in cross-section according to lines V-V in FIG. 4.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

The embodiments show possible variants of the claimed method and system, wherein it should be noted at this point that the invention is not restricted to the specifically shown variants thereof, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

In addition, it should also be noted that the term "machine" is used as a synonym or umbrella term for an industrial robot and the term "machine part" mainly represents an articulated arm of such an industrial robot. Such an articulated arm of a multiaxial industrial or articulated robot—also occasionally referred to as an articulated arm robot—comprises at least one joint by means of which the respective articulated arm is mounted rotationally or in a rotary manner. The corresponding mechanical joints thus define rotatory movement axes or axes of rotation, to which movement drives are assigned respectively. The term "machine part" also relates to workpieces for the time periods in which they enter into a frictional or positive connection with the machine, thus are held by a robot gripper for example, and as virtually a part of said machine can execute movements influenced by control technology.

FIG. 1 shows an embodiment of a control system 1 for an industrial robot 2 illustrated schematically and by way of example. By means of such a control system 1, in which a movement setting means 3 to be operated by hand is used for generating control instructions for the industrial robot 2, the programming or specification of movements or sequences of the industrial robot 2 is made possible. Said industrial robot 2 can be formed by a multiaxial manipulator unit known from the prior art or by another handling unit, by means of which technical processes, for example welding or painting processes or handling processes for workpieces, can be performed by automation or part-automation. Such an industrial robot 2 thereby represents a preferred embodiment of a machine to be controlled according to the invention.

At least one integrated and/or external control device 4, 4' is assigned to the at least one industrial robot 2 within the control system 1. The control system 1 can be formed by any electrotechnical control devices 4, 4' known from the prior art, wherein central and/or de-central control architectures can be used according to the technological requirements. In particular, by means of the interaction of a plurality of integrated and/or external control devices 4, 4' a distributed control system 1 can be assembled in order to manage the respective control sequences for a multiaxial industrial robot 2.

In addition to said movement setting means 3 to be controlled by hand a mobile handheld terminal 5 can be provided which is shown by dashed lines. Such a mobile handheld terminal 5 has a high degree of functional density or functional variety and is a relatively highly developed, portable operating and observation device for the respective control sequences in the control system 1.

The movement setting means 3 to be controlled by hand can comprise at least one safety switching device 6, in particular at least one permissive button or a suitable input or activating means, which is provided for the user to indicate consent to potentially dangerous movements or sequence changes.

The movement setting means 3 to be controlled by hand is designed to be as light and compact as possible, preferably pen-like or even pistol-like, in order to achieve an intuitive movement setting relative to the industrial robot 2 which is as comfortable as possible. For interaction between the operator and the control system 1 the movement setting means 3 can comprise various input and output elements, for example buttons, switches, light-emitting diodes and/or a small display 7. In particular, on the movement setting means 3 to be controlled by hand there can be at least one manually activated operating element 8, for example in the form of at least one push switch, a 4-quadrant button element, an adjusting wheel, a rocker switch, as miniaturized joystick or the like. By means of said operating element 8 the operator is able to interact with the control system 1 and influence movements or sequences of the industrial robot 2 or other multiaxial controllable machine. In the embodiment according to FIG. 1 the movement setting means 3 can in principle be moved freely in space, in particular held during the control-technical movement setting in the hand of the operator and is thus designed to be dynamic as a whole.

It is essential that by means of the movement setting means 3 to be controlled by hand by the operator at least a portion of the data is generated for controlling the movement or sequence programming of the industrial robot 2 or other machine. For this purpose the operator defines, by means of the movement setting means 3, a reference movement and/or a reference position or reference orientation, which is implemented by the control system 1 such that the industrial robot 2 to be controlled or operated adopts movements or reference positions according to the specifications and any specified changes in the respective technical sequence or process sequence are implemented. The movement setting means 3 to be controlled by hand can comprise an integrated sensor system 9 and/or an external sensor system 10 can be assigned to the movement setting means 3 to be controlled by hand, by means of which the orientation and/or the position of the movement setting means 3 to be controlled by hand in space is determined or evaluated. The information or data of the integrated and/or external sensor system 9, 10 then represents at least a portion of the data or control commands, which are used or required for the movement control or sequence programming of the industrial robot 2.

The movement setting means 3 according to one possible embodiment can comprise only one integrated sensor system 9 and can thus function as an active movement setting means 3. Alternatively, the movement setting means 3 can also be designed to be passive, wherein by means of an external sensor system 10 the corresponding orientation and/or position data can be determined or their temporal shift is recorded. Of course, a combination of integrated and external sensor systems 9, 10 is possible, in order for example to achieve a particularly reliable and highly accurate determination of the orientation or position data of the movement setting means 3 with reference to the three-dimensional space. The term sensor system 9, 10 is also defined in addition to being the actual sensor detection means as a corresponding evaluation means, in particular an electronic processing and evaluation device, which transfers the sensor-detected signals or information into data or interface protocols which can be used or processed by the control components of the control system 1.

The respective sensor system 9, 10 can be in the form of any detection and evaluation means known from the prior art, in order to be able to determine or define the orientation and/or the position of objects in space by data or control technology. In particular, for this so-called inertial sensor systems can be provided which preferably define the sensor system 9 integrated into the movement setting means 3. By means of said inertial sensors, which can consist of inertial sensors, in particular acceleration recorders and angular position sensors, and possibly magnetic field sensors, there can be a computer-supported detection of orientation or position data and changes thereof.

The implementation of the embodiment according to FIG. 1 is preferably performed in association with inertial sensors. The sensor system 9, 10 can also comprise triangulation methods known from the prior art for transmitted signals with a specific run-time, optical image data detection with the aid of video cameras, and other position detecting systems, such as for example GPS or local position detection systems. Is important that the respectively designed sensor system 9 and/or 10 enables the sufficiently accurate and reliable detection of the orientation and/or position of the movement setting means 3 to be controlled by hand.

According to one advantageous embodiment the movement setting means 3 can function virtually like a handgrip for the end effector of the industrial robot 2 and the position and direction changes of the movement setting means 3 are transformed into similar movements of the industrial robot 2.

It can be advantageous if the control commands, which are based on a setting by the movement setting means 3 to be controlled by hand, are converted essentially instantaneously by the industrial robot 2, in particular in real-time, into corresponding movements or sequence changes. One of the preconditions for the implementation of the user-side movement settings by the industrial robot 2 is that the movement or sequence change set by the operator can be carried out technically in consideration of predefined technical limitations of the industrial robot 2, such as for example a structural or environmentally determined accessibility of positions or orientations, or a technically achievable or a safety-related permissible, maximum speed of axes or adjusting elements of the industrial robot 2. In addition to the technical workability the executed movement of the industrial robot 2 should also correspond as far as possible to the actual will of the operator in all situations and therefore one aspect of the specified measures is that identifiable interference or discrepancies should be checked for by an automated or automation-supported process and compensated for if necessary.

The sensor system 9 integrated into the movement setting means 3 to be controlled by hand or the movement setting means 3 per se and/or the external sensor system 10 comprises according to one advantageous configuration at least one data interface 11, 12, via which at least data for movement control or sequence programming are transmitted directly or indirectly via at least one associated data connection 13, 14, 15 to the control device 4, 4', which control device 4, 4' is designed for changing states of the industrial robot 2, as shown schematically in FIG. 1. The data connection 13 can be designed here as a direct connection between the sensor system 9 or the movement setting means 3 and the control device 4, or—as shown schematically—as an indirect data connection 14 via an intermediate or base station or control device 4' upstream of the control device 4. Alternatively or in combination with this also there can be an indirect data connection 15, which runs from the external sensor system 10 via one or more electronic intermediate or base stations or control devices 4' to the control device 4 of the industrial robot 2.

The data connections 13, 14 or 15 can be designed to be wired or wireless, in particular by radio connection. It is essential that the acceleration and/or rotary angle values determined by the sensor system 9 and/or the orientation or position data of the movement setting means 3 determined by the sensor system 10 are transmitted via a suitable data connection 13, 14 or 15 to the control device 4, 4' and are used or processed at least partly by the latter, before the corresponding control commands or controls of the movement setting means 3 are performed by the industrial robot 2.

According to one advantageous measure control commands from the movement setting means 3 to be controlled by hand are only implemented by the industrial robot 2 if at the same time the safety switching device 6, in particular at least one permissive button or a functionally corresponding input or activation means is activated manually on the movement setting means 3 by an operator such that consent is given to perform potentially dangerous movements or to change potentially safety critical sequences of the industrial robot 2. This signal is triggered by the operator by activating the safety switching device 6 and recognized by the control system 1 or by the movement setting means 3 or the control device 4, 4' as active or deliberate consent to perform potentially dangerous actions. In this way mainly the unintentional or unwanted triggering of actions or the unintentional initiation of movements of the industrial robot 2 is avoided for the most part.

As shown schematically in FIG. 1, the data connection 14 between the sensor system 9 integrated into the movement setting means 3 and the control device 4 or 4' can be implemented by a radio connection. Alternatively, it is also possible to form the data connection 13 by means of a cable connection, as represented by dash-dotted lines. Due to the immediate vicinity of the movement setting means 3 and the industrial robot 2 and its control device 4 it is also possible to provide the cable connection without sacrificing comfort or ergonomics.

The data interface 11 and the corresponding, additional data interface on the control device 4 or 4' can thus be formed by radio transmitters and/or receivers for transmitting and/or receiving electromagnetic waves. Said transmitters and/or receivers can be formed by devices corresponding to the Bluetooth, WLAN or ZigBee standard and by similar wireless data transfer systems known from the prior art.

Alternatively, it is also possible for the data interface 11 to be provided in or on the movement setting means 3 for establishing a wired or cable-bound data connection. For this the data interface 11 and the corresponding, additional data interface is formed by electric cable interfaces, between which a cable connection is formed, as indicated by dot-dashed lines.

According to one advantageous measure by means of the data connection 13 or 13, 14 between the movement setting means 3 controlled by hand and the control device 4, 4' in addition to information about the respective activating state of the operating element 8, which is provided for the starting or activation of the corresponding movements or sequences of the industrial robot 2 by the user, also data relating to the orientation and/or position of the movement setting means 3 to be controlled by hand is transmitted to the control device 4, 4' with reference to the three-dimensional space.

A movement setting means 3 according to the prior art described above comprises at least one means or at least one means, in particular the internal and/or the external sensor system 9 or 10, is assigned to the movement setting means 3, which means is designed for determining the orientation and/or position of the movement setting means 3 in space. This information can be used to shape the effect of a previously mentioned operating element 8 for positioning an industrial robot 2 or a machine tool depending on the orientation and/or position of the movement setting means 3. In particular, a movement of the movement setting means 3 or the deflection of an operating element 8 on a movement setting means 3 in a specific direction leads to an axial movement in the same direction according to the deflection. Alternatively or in addition to this movements of the movement setting means 3 can also be converted directly or in a scaled form into a corresponding movement of the industrial robot 2. This is comparable with guiding the industrial robot 2 by using a virtual handgrip attached onto the latter.

The typical environment, various situations, problems and effects of the generic system are explained by way of example and summarized in the following. Such movement setting means 3 enable a very simple and intuitive positioning of the axes or effectors of industrial robots 2 and can save the user from thinking and applying various coordinate systems. This is mainly an advantage for persons who only have to perform occasional or very simple adjusting processes. For example in many cases the robot paths for assembly or painting processes on vehicle parts is mostly already precalculated and developed in advance and offline by means of suitable CAD software, so that only simple adjustments have to be made directly on the production line for a few reference points. During such a control or programming sequence there is a feedback loop, in particular sensor feedback from the industrial robot 2 to the operational control or control device 4 of the industrial robot 2 and also purely visual feedback, which the operator acquires by observing the movement sequences of the industrial robot 2, as shown schematically in FIG. 1. This feedback is important for completing planned sequences.

As already mentioned above, it can be advantageous, if on the movement setting means 3 a safety switching device 6 is provided in the form of at least one so-called permissive button, which permissive button is activated during an operating process for triggering or enabling a potentially dangerous movement, in order in this way to enable the movement or the drives. For this purpose such an electromechanical permissive button is moved by the operator from its position of rest into a first activation step and held there during the movement. If the permissive button is released, for example in a dangerous situation, so that the latter returns to its inactivated state, or is moved by the operator by desperately applied pressing into a second activation step or into a second activation state, the movement is stopped immediately.

Particularly if the sensor system 9 used in the movement setting means 3 is formed by a so-called inertial sensor system, with the orientation of the movement setting means 3 in space determined by the control system 1, there may gradually be discrepancies between the standard values of the movement setting means 3 and the actual values of the industrial robot 2. In particular, this is due to the fact that inertial sensors detect acceleration forces, i.e. function as acceleration detectors, and on the basis of the detected acceleration values a calculation is made of the path covered or the completed movement and/or orientation in space. The orientation information to be determined relating to the movement setting means 3 can thus be generated by the control system 1 or by at least one of its control devices 4, 4' from sensory inputs of the sensor system 9 integrated into the movement setting means 3 and their further computer processing. Potential errors or inaccuracies in the determined position or orientation information are based both on errors in the sensor data and on numerical errors during the processing. The determination from the acceleration data of the sensor system 9 in or on the movement setting means 3 of the corresponding speed, position and/or orientation information relating to the movement setting means 3, is within the expert knowledge of a person skilled in the art, which is why this is not discussed further here. Furthermore, there are numerous examples of the required processing of signals or mathematical operations in the corresponding literature.

Inertial sensors possibly used in the movement setting means 3 are used for measuring translatory and rotary acceleration forces. By combining a plurality of inertial sensors into an inertial measurement unit (IMU) the accelerations can be measured with reference to the six freedoms or degrees of freedom. Advantageously, the sensor system 9 is designed as an inertial measurement unit (IMU), which usually comprises translation sensors for detecting the linear acceleration and rotation speed sensors for measuring the angular speed. By means of acceleration sensors the translatory movement or change of movement can be calculated, whereas by means of the rotation speed sensors the respective rotational movement of the movement setting means 3 can be calculated.

The translation sensors and/or the rotation speed sensors can hereby be arranged orthogonally so that they can detect the respective accelerations in the direction of the x or y or z axis or about the x or y or z axis. To improve the precision or to correct the drift of the said sensors in addition magnetic field sensors, in particular compass sensors, can be used.

The possibly provided external sensor system 10 can comprise in particular a camera system with a connected image evaluation and/or a detection system based on runtime calculations for determining the position and/or orientation of the movement setting means 3 in space, in particular its so-called pose or position in space.

As shown by way of example and schematically in FIG. 1, 2 the movement setting means 3 comprises at least one imaging sensor 16 and/or at least one distance-sensitive sensor 17. In particular, it is possible that either only at least one imaging sensor 16 or only one distance-sensitive sensor 17 is provided. According to the embodiment of FIG. 2 at least one imaging sensor 16 and also at least one distance-sensitive sensor 17 are implemented.

The imaging sensor 16 in or on the movement setting means 3 is typically formed by a camera unit 18 or a so-called CCD module. The at least one distance-sensitive sensor 17 can advantageously be formed by a short-range distance sensor in the form of an ultrasound sensor, a light-reflection sensor, a magnetic field sensor or an RFID sensor or transponder reader. In order to determine 3D coordinates or three-dimensional relative positions, it can be advantageous if such a distance-sensitive sensor 17 comprises at least three spaced apart individual sensors, as illustrated schematically in FIG. 2. In particular, a plurality of spaced apart individual sensors can form such a distance-sensitive sensor 17, wherein the individual sensors are provided for the joint detection of a relative position with reference to at least one reference mark 19, 19', 19" or wherein at least one distance-sensitive sensor 17 is provided for the data technical detection of the specific character or the identifier or data of such reference marks 19, 19', 19". The imaging sensor 16 can be provided for detecting image data or for detecting a time sequence of image data in the form of a video sequence. The imaging sensor 16 can however also be provided for the data technical detection of the specific character or the identifier or data of such reference marks 19, 19', 19".

As mentioned above, the imaging and/or distance-sensitive sensor 16, 17 for detecting at least one reference mark 19, 19', 19" is provided on the industrial robot 2 or on a machine to be moved or machine part. Such a reference mark 19, 19', 19" to be detected by the respectively used sensor 16, 17 can be in the form of a data-technical identifier or a machine-readable information carrier. In particular, such a reference mark 19, 19', 19" to be detected by the respectively used sensor 16, 17 can be designed as a two-dimensional marking, for example as a barcode or QR code. However, also a distinctive or data technically unambiguous pattern can consist of a two-dimensional marking. Alternatively or in combination with this such a reference mark 19, 19', 19" can also be designed as a 3D marking, in particular as a three-dimensional body, such as for example a cuboid or tetrahedron 20—FIG. 2. Preferably, a plurality of such reference marks 19, 19', 19" can be arranged or distributed on the machine to be controlled or on the industrial robot 2 to be controlled. Preferably, at least one optically or differently sensor-detectable reference marking 19, 19', 19" is assigned to each or at least most of the articulated arms 21, 22, 23 of the industrial robot 2 respectively. It can also be advantageous, as illustrated in FIG. 1, to assign one or more reference marks to the end effector 24, in particular the respective tool, such as for example a welding torch, a gripping instrument, a painting device or the like. It is advantageous, to assign a reference mark 19, 19', 19" to at least one, in particular all rotary or translatory movable machine parts or articulated arms 21, 22, 23 of the industrial robot 2 (and if necessary to a workpiece not shown in the figures and moved by the industrial robot 2, wherein advantageously the individual respectively used reference marks 19, 19', 19" are individually distinguishable, i.e. bear or represent a distinctive, unambiguous identifier.

According to one advantageous measure in the control sequence the at least one sensor 16, 17 with at least one reference mark 19, 19', 19" on a machine part to be moved or a corresponding articulated arm 21, 22, 23, in particular with a reference mark deliberately selected by the user is moved into a selected relative spatial position. In particular, a spatial connection is created between at least one reference mark 19, 19', 19" and the movement setting means 3, in that its imaging and/or distance-sensitive sensor 16, 17 is used or employed. In particular, in a first or initial method step by using image-based and/or distance-based data a coupling condition 25 is determined from the relative position between the movement setting means 3 and the respective reference mark 19, 19', 19". Such a coupling condition 25 is symbolized for example in FIG. 1 by dashed lines. Such a coupling condition 25 between the movement setting means 3 and the selected reference mark 19, 19', 19" can be defined here as a fixed coupling condition 25 or by a coupling condition 25 articulated about a specific degree of freedom. Said coupling condition 25 is defined as purely virtual, in particular there is no mechanically fixed coupling and no physical connection between the movement setting means 3 and the respective machine part or industrial robot 2. It is essential here that in a first or initial step a defined coupling condition 25 is created. Then in a second or following method step during a movement of the movement setting means 3 the machine part bearing the corresponding reference mark 19 or 19' or 19" or a respective articulated arm 21, 22, 23 is tracked by control technology such that within the technical limits of the machine or the machine part the coupling condition 25 set in the first method step is adhered to or complied with as far as possible. In particular, industrial robots 2 or their articulated arms 21, 22, 23 are subject to technical limits with respect to their kinematics, dynamics and the reliability of the movements.

According to one advantageous measure the control-technology tracking of the machine part or articulated arm 21, 22, 23 bearing the respective reference mark 19, 19', 19" is performed according to the following or second method step by using image-based or distance-based data and/or data from the sensor system 9 integrated into the movement setting means 3, in particular inertial or acceleration sensors, and/or data of the external sensor system 10 for determining the position or change in position of the movement setting means 3. This control-technology tracking of the industrial robot 2 or at least one of its articulated arms 21, 22, 23 based on data from the internal sensor system 9 and/or the external sensor system 10 has already been explained in detail above.

As already explained, the set coupling condition 25 between the movement setting means 3 and the respective machine part bearing a reference mark 19, 19', 19" can describe a rigidly coupled, virtual connection. This means that the temporally variable alignment and position of the movement setting means 3 is transmitted to the movement of the machine part or articulated arm 21, 22, 23, as though the movement setting means 3 and the machine part form a structurally rigid unit. According to one embodiment it is also possible that the set coupling condition 25 describes a virtual connection 27 articulated about at least one axis— shown in FIG. 2 by dashed lines. However, also the already mentioned, rigidly coupled, virtual connection 26 can be provided, as symbolized in FIG. 2 by a dot-dashed line.

It can also be advantageous that for the degrees of freedom of the machine movement which are not already determined by the coupling condition 25 and the movement of the movement setting means 3, additional secondary conditions can be set either automatically, or by input by the user on the movement setting means 3 or on the mobile handheld terminal 5, or on a stationary operating panel. Such a secondary condition can determine that during the tracking the orientation of a specific movable machine part is to be maintained in space, or the position of a point linked to a movable machine part in space should remain unchanged or that both the position and the orientation of a movable machine part should be kept constant. Such secondary conditions can for example be selected or preadjusted by the operating elements 8 on the movement setting means 3. Such secondary conditions can however also be linked quickly to the identity of a coded reference mark 19, 19', 19" and on a determined machine part a plurality of markings can be arranged that are distinguishable for the user, e.g. color or by symbols, so that by selecting a specific reference mark 19, 19', 19" from said plurality of reference marks 19, 19', 19" on a determined machine part or articulated arm 21, 22, 23 the corresponding secondary conditions are selected automatically by the user. This makes it possible to reduce the number of operating elements and it also enables rapid and intuitive operation.

It is also advantageous if according to the method the tracking of the movable machine part is performed during the second or following method step only during or after an enable instruction by the operator, in particular only during the activation of a movement coupling command button or a safety switching device 6 in the form of an enable or permissive button.

According to a particularly advantageous measure, a plurality of distinguishable coded reference marks 19, 19', 19" is provided on different positions on a movable part or on a plurality of movable parts of the machine or the industrial robot 2. By means of the imaging and/or distance-sensitive sensor 16, 17 of the movement setting means 3 the user can detect the coding or specific character of the respective reference mark 19, 19', 19". In particular, such a reference mark 19, 19', 19" can be selected during the reading for determining the coupling condition 25 by the user, in that an operator positions the movement setting means 3 such that the imaging or distance-sensitive sensor 16, 17 detects or can detect the coding of the respectively required reference mark or the respectively desired reference mark 19, 19', 19". In particular, by means of the at least one imaging or distance-sensitive sensor 16, 17 of the movement setting means 3 a reference marking 19, 19', 19" arranged respectively on various machine parts or articulated arms 21, 22, 23 of the industrial robot 2 can be read or detected and identified selectively. This selection process can also include a preceding or subsequent operation in the form of pressing a button on the movement setting means 3. However, this is not mandatory as in principle simple detection is sufficient.

As already explained, at least individual reference marks 19, 19', 19" are designed to be distinguishable by sensor and control-technology, in order to thus make is possible to determine by control-technology the respective attachment position on the machine or on the machine part. The reference marks can hereby comprise machine-readable information, in particular coded information such as barcodes. However, it is also possible to provide plain text information, which can be read by the imaging sensor 16 and a downstream OCR detection or OCR evaluation. The relevant machine-coded information and/or information represented in plain text of the reference marks 19, 19', 19" can also provide information about the respective attachment position on the machine or on the respective machine part, in order to thus facilitate or make it as intuitive and simple as possible for the operator to perform the further hand-guided control sequence by means of the movement setting means 3. The information on the reference marks 19, 19', 19" can comprise per se the respectively relevant data and/or can represent data technical links to the underlying datasets.

In particular, it can be advantageous if properties and information are linked by data technology to the coding of a reference mark 19, 19', 19". This facilitates the flexibility and variability of the control system 1. Said properties and information can represent the attachment position of the reference mark 19, 19', 19" on the machine, a descriptive name of the reference mark, an identifier or name of the machine part or articulated arm 21, 22, 23 bearing the reference mark, or additional conditions for setting degrees of freedom determined by the coupling condition 25 for the virtually coupled movement.

According to one advantageous measure the operator is informed by an output means of the movement setting means 3, in particular by its display 7 or another visually perceived output means, when the imaging or distance-sensitive sensor 16, 17 has detected a reference mark 19, 19', 19". In this way it is possible to display whether the reading of a reference mark 19, 19', 19" targeted by the operator or provided for selection has actually been successful. Furthermore, it is possible that at least portions of the properties and information linked by data technology to the reference mark 19, 19', 19" or read are output to the operator via an output means of the movement setting means 3, in particular via its display 7.

It can also be advantageous if the coupling condition 25 is predefined or preset by the operator moving the movement setting means 3 into a desired position relative to the reference mark 19, 19', 19". The subsequent setting or activation of the coupling condition 25 intended by the operator can advantageously be performed by a subsequent activation of an input or activation means, in particular a specific operating element 8 on the movement setting means 3.

Furthermore, it can be advantageous if the relative position from which the coupling condition 25 is determined or can be determined is limited technically. This can in particular be defined by a limited distance between the reference mark 19, 19', 19" and the movement setting means 3, or by a direction setting within a specific space segment relative to the reference mark 19, 19', 19" and/or relative to the movement setting means 3.

According to one practical measure the reference mark 19 or at least one of a plurality of reference marks 19, 19', 19" is in the form of a 2D-marking in the form of a barcode, a symbol, a graphic or a clear, random pattern. Alternatively or in combination with this the reference mark 19 or at least one of a plurality of reference marks can be in the form of a 3D marking in the form of a cuboid, a tetrahedron 20, in the form of Cartesian pointer axes, or in the form of another 3D object on the machine to be controlled in movement.

According to one advantageous embodiment the movement setting means 3 can be designed to be rod-like or strip-like, whereby it can have a length 28 of between 10 cm and 100 cm. The at least one imaging sensor 16 or the at least one distance-sensitive sensor 17 is advantageously arranged at one end of the movement setting means 3 averted from the grip end or gripping section 36, as indicated schematically in FIG. 2. In particular, it is advantageous, if the movement setting means 3 is designed for the contactless, distance-associated movement coupling relative to the machine to be controlled or a selected machine part, wherein a distance 29 between the movement setting means 3 and the machine and the machine part can have a distance which is selected from a range between 20 cm and 200 cm.

According to one advantageous embodiment it is also possible that the virtual coupling or the initially created coupling condition 25 is modelled mathematically as a flexible, mechanical connection 26, 27. Said mathematical modelling is preferably performed in the control device 4, 4'. The respective mathematical modelling can reset or calculate on the basis of a model the aforementioned rigidly coupled connection 26—FIG. 2—mainly the aforementioned articulated connection 27. Alternatively or in combination with such modelling it is also possible that for the machine part bearing a selected reference mark 19, 19', 19" and thus for the respectively selected articulated arm 21, 22, 23 to be moved the influence of physical inertia and/or the influence of friction with regard to the subsequent movement to be performed is modelled or simulated mathematically. It is thus also possible that the physical influencing factors such as inertia or friction are integrated into a simulation model and the respective mathematical simulation result influences the coupling condition 25 or the type of tracking of the machine part to be moved or the articulated arm 21, 22, 23 to be adjusted mathematically and by control technology.

As also shown most clearly in FIG. 2, the external sensor system 10 can be defined by a plurality of cameras 30, 31, 32 which are distributed in space. Preferably, at least three cameras 30, 31, 32 are provided, the relative position of which is defined or the respective position and alignment in space of which is defined and known by the control side. With reference to the respective image data of said cameras 30, 31, 32 recording the operating area of the industrial robot 2 and the operator or by the respective image sequences in a known manner the respective actual position or orientation and position of the movement setting means 3 in space can then be calculated mathematically. These calculations can be performed in principle by means of the internal and/or external control device 4, 4' of the robot control system 1. By mainly including the actual data, which is known to the control device 4, 4' with reference to the position or orientation of the industrial robot 2, a comparison can then be made or tracking with reference to the movement settings of the movement setting means 3. In particular, it is possible in this way that the industrial robot 2 can follow the settings of the movement setting means 3 identically or virtually identically. To enable this movement tracking, the actual positions and actual orientations of the individual parts or components of the industrial robot 2 with reference to the three-dimensional space are always known to the control device 4 or 4' assigned to the industrial robot 2. By making a comparison between the reference orientation and/or reference position data (reference pose) by the movement setting means 3, in particular by the internal and/or external sensor system 9, 10 with the actual orientation and/or actual position data (actual pose) of the industrial robot 2, which data is always available to the control device 4, 4', it is then possible to perform by control technology an exact tracking or at least a best-possible tracking of the movements of the industrial robot 2 or its articulated arms 21, 22, 23 relative to the movements of the movement setting means 3.

According to one practical measure the movement setting means 3 can be formed by a standard, commercially available Smartphone or by a Tablet PC, on which components the corresponding software is implemented for executing the given method.

FIG. 3 illustrates schematically an additional embodiment of a control-technical movement setting means 3 to be guided by an operator for influencing the movement or for teaching an industrial robot 2 or a similar machine.

Also in this way movements of the movement setting means 3 are converted into corresponding movements of the industrial robot 2. The difference from the aforementioned embodiment is that in this way the movement setting means 3 can be supported or is supported on the machine to be controlled, in particular on movable parts or on the parts or articulated arms 21, 22, 23 to be moved.

The corresponding movement setting means 3 comprises at least one resilient contacting and spacing element 33. Said contacting and spacing element 33 is provided for contacting or touching a machine part coupled by control technology, for example the articulated arm 22 of the industrial robot 2, in the vicinity of or in the vicinity around the respective reference mark 19, 19', 19", for example in the vicinity of or detection area of the reference mark 19'. In particular, said movement setting means 3 creates with its contacting and spacing element 33 in the vicinity of the reference mark 19' or alternatively somewhere on the machine part to be adjusted which bears the selected reference mark 19' a frictional or positive transmission of force between the moved machine part, for example the articulated arm 22, and the movement setting means 3. In particular, by means of this transmission of force or by the mechanical fitting or by the load-transferring support of the movement setting means 3 on the machine part to be moved, for example the articulated arm 22, the operator, i.e. the person who guides or holds the movement setting means 3 is given haptic feedback relating to the finally performed machine movement by the control device 4, 4'. This improves the ergonomics or intuitiveness of the machine operation, in particular the movement guiding of the industrial robot 2. This touching or support and contacting of the movement setting means 3 on a surface of the selected machine part or articulated arm 21, 22, 23 can preferably be designed to be non-conductive, in particular electrically insulating. In any case an electrically conductive connection between the movement setting means 3 and between said contacting and spacing element 33 or the sensor head 37 and the respective machine part, for example the articulated arm 22, is not absolutely required or necessary.

The elastically flexible contacting and spacing element 33 can comprise a telescopic or length-adjustable coupling rod 34 and/or a buffer element 35, which buffer element 35 can comprise a contact surface 38 with greater friction than metal or plastic surfaces of the industrial robot 2, for example an elastomeric plastic.

In the case of a length-adjustable coupling rod 34 the latter can be defined by telescopically adjustable rod elements. If at one end of the movement setting means 3 averted from a gripping section 36 a buffer element 35 or corresponding sensor head 37 is formed, a resilient mechanical coupling or a mechanical coupling under specific mechanical interaction can be formed and there can be transmission of force between the user or the operator and the respectively performed movements of the industrial robot 2. In particular, in this way it is ensured that the operator receives haptic feedback which improves the ergonomics for the user and the achievable precision of the movement in connection with the correspondingly designed movement setting means 3.

The probe or sensor head 37, which is mounted to be either flexible or resilient at one end opposite a gripping section 36 of the movement setting means and/or is linearly adjustable or telescopic and/or is restorable in another way or adjustable relative to the gripping section 36 of the movement setting means 3, can comprise or support the at least one imaging sensor 16 and/or the at least one distance-sensitive sensor 17. The distance-sensitive sensor 17 can be defined in particular by an RFID-reader, by a magnetic field sensor, or by another distance-sensitive sensor. It is essential that the respective distance-sensitive sensor 17 in the movement setting means 3 can detect or determine the corresponding reference mark 19, 19', 19", for example the reference mark 19' on the articulated arm 22 to be moved. Alternatively or in combination with this it is also possible that the sensor head 37 comprises an imaging sensor 16 in the form of a CCD module or a miniature video camera in order to thus detect and record the optical information or properties of an optical reference mark 19, 19', 19".

Advantageously, the imagine sensor 16 and/or the distance-sensitive sensor 17 in the sensor head 37 is connected, in particular line-connected, to an electronic evaluation device 39 in the movement setting means 3. In the electronic evaluation device the respective signals of the sensors 16 or 17 are either preprocessed or processed and evaluated for the most part. By means of the data technical interface 11 of the movement setting means 3—as already described above—a cable-bound and/or wireless transmission of the respective system-relevant information or data can be sent to the control device 4 or 4'—FIG. 1—of the industrial robot 2.

For the data visualisation or optical signalling of system-relevant states and/or for representing selection or input menus an output means in the form of a display 7 can be provided on the movement setting means 3. In addition, as already described above, on the movement setting means 3 at least one input element can be provided, for example in the form of an operating element 8 and/or a safety switching device 6.

In the embodiment according to FIG. 3 in particular at the end of a rod, for example at the end of a telescopic or length-adjustable coupling rod 34, one or more miniaturized cameras, i.e. imaging sensors 16, can be formed. On the industrial robot 2 itself and/or on the workpieces or on the various articulated aims 21, 22, 23 machine-readable reference marks 19, 19', 19" are formed which are distinguishable from one another in terms of data technology, for example in the form of image marks. Said image marks can be in the form of QR codes or the like and adhered directly onto the respective machine components. By pressing a command button, for example an operating element 8 on the movement setting means 3 by means of the control software an image of the reference marking 19' is recorded and then the distance and the position is established relative to the camera or to the imaging sensor 16, in particular to the probe or sensor head 37. Said data is used as a reference for the further reference positions or reference poses of the industrial robot 2. The respective image or reference marks 19, 19', 19" can also contain information about which point or in which position the industrial robot 2 is virtually held or coupled, so that the control software of the control device 4, 4'—FIG. 1, 2—can calculate the kinematic movements of the industrial robot 2 and can then perform or track then accordingly.

Instead of having optically detectable reference marks 19, 19', 19" it is also possible to form reference marks 19, 19', 19" as clear, distinguishable RFID tags and to define the sensor system 17 in the movement setting means with a RFID reader.

According to one advantageous embodiment it is possible that on the probe or sensor head 37, in particular in the vicinity of the imaging sensor 16, at least one light source 40, in particular a lighting device is provided to improve the image taking of the camera or the imaging sensor 16.

Once the desired movement coupling has been formed between the movement setting means 3 and the machine part to be moved, for example the articulated arm 22, the industrial robot 2 or its articulated arm 2 performs movements which are executed by means of the movement setting means 3. During the tracking of the movement the industrial robot 2 or its control device 4, 4' maintains mechanical contact between the probe or sensor head 37 and the respective machine part and it is ensured thereby that the mutual support or bearing force is maintained or is maintained as well as possible. In particular, there is a load-transferring support at least in phases or at least in sections between the probe or sensor head 37, in particular between the contacting and spacing element 33 of the movement setting means 3, and the respective housing or articulated arm surface of the industrial robot 2, whereas the control device 4, 4'—FIG. 1—moves the industrial robot 2 according to the movement settings of the movement setting means 3.

The initially selected and detected reference mark 19, 19' or 19" can be used as an additional control technical aid or the reference mark 19' selected in the initial step—as illustrated schematically in the embodiment according to FIG. 3—for the simple choice and selection of the machine part of the industrial robot 2, for example the articulated arm 22, with which interaction with the operator or the movement setting means 3 is desired. According to one advantageous measure the respective reference marks 19, 19', 19" can perform additional control technical functions, such as for example a mode change, or an axis locking function and the like. In this way in a simple manner instead of complex user menus or function keys the operation can be made considerably easier and also more failsafe.

FIG. 4, 5 illustrate a further embodiment of a practical control process or a component part of the control systems 1 for implementing in the given control system 1. In particular, FIG. 4, 5 show an advantageous embodiment of a movement setting means 3 to be guided or operated by hand by an operator, which movement setting means 3 can preferably be used or implemented as a component part for implementing the control process and control system 1.

The corresponding movement setting means 3 comprises a contacting and spacing element 33, which is formed by at least two, in particular by three or four, resilient support elements 41. According to the representation said support elements 41 are designed to be foot-like or column-like, wherein said support elements 41 have a resilient mobility or a resilient restoring adjustability. For example, said support elements 41 can be defined by an elastomeric plastic fold-like or film-hinge-like shaping or by at least one knee joint. Likewise the support elements 41 can be designed in the form of helical springs or leaf springs. It is essential that the respective support elements 41 overall have a resilient or spring-like restoring contacting and spacing element 33 for the movement setting means 3 relative to a surface of the articulated arm 21, 22, 23 to be moved. For example the respective support elements 41 have arched protrusions or hinge-like joint sections which enable a relative adjustment of the movement setting means 3, in particular f its at least one sensor 16, 17 relative to the reference mark 19, 19', 19" moved on the respective articulated arm 21, 22, 23.

The corresponding support arms or support elements 41 can be made from an elastomeric material which increases the friction of the surface of the industrial robot 2. The respective support elements 41 can also have contact feet 42, which enable as far as possible the slip-resistant, mechanical contacting of the movement setting means 3 on the industrial robot 2 or on the respectively desired position of the joint arms 21, 22, 23. According to one embodiment said contact feet 42 can also be defined by suction cups, which on the one hand can provide a particularly slip-resistant support, on the other hand also a simply releasable and re-activatable coupling between the movement setting means 3 and the respective articulated arm 21, 22, 23. It is an advantageous here if the movement setting means 3 is positioned at least approximately axially centrally or centrally to the respective reference mark 19, 19', 19". An absolutely axially aligned centering or alignment of the movement setting means 3 relative to a reference mark 19, 19', 19" to be read or referenced is not necessary however.

Instead of having at least two foot-like support elements 41 it is also possible alternatively to provide an annular or tubular, elastically flexible support body 43, as indicated schematically in FIG. 5 by dashed lines. By means of such a support body 43, the sensor system in the movement setting means 3 is positioned in a supported manner in a specific relative position to the reference mark 19, 19', 19" to be read or detected and is supported in principle to be jitter-free as far as possible. Such an annular or tubular support body 43 can have defined weakened areas, openings and/or pleats or wrinkles to provide the required elasticity in its casing section, which enable a spatial relative adjustment of the at least one sensor 16, 17 of the movement setting means 3 relative to the respective reference mark 19, 19', 19" on the respective articulated arm 21, 22, 23. It is also advantageous if said annular or tubular support body 43 which is adjustable in a plurality of directions in space surrounds the reference mark 19, 19', 19" to be detected or at least partly borders the latter when the movement setting means 3 is fitted or docked for control-technical purposes on the respectively selected articulated arm 21, 22, 23. Also such an annular or tubular support body 43 can preferably have on its contact surface 38 a friction-increasing adhesive effect or frictional effect relative to the typically metal surfaces of the industrial robot 2 or its articulated arms 21, 22, 23.

By means of the at least two elastically flexible support elements 41 or by means of the at least one annular or tubular support body 43 the at least one distance-sensitive or imaging sensor 16, 17 of the movement setting means 3 as a result of applying an adjusting force by the operator can be moved into different positions relative to the reference marking 19, 19', 19" attached to the respective articulated arm 21, 22, 23. Said relative adjustments are such that preferably in each of the adoptable relative adjustment positions at least a portion of the reference mark 19, 19', 19" can be detected or identified by the sensor 16 or 17. FIG. 4 shows a rotationally deflected adjusting position of the movement setting means 3 by dashed lines. In addition or in combination with such rotational or tilting adjustment movements of the movement setting means 3 relative to the reference mark 19 to be detected it is also possible that the movement setting means 3 performs translatory relative adjustments or these can be performed by the operator. In particular, it is possible that the movement setting means 3 enables rotational adjustment movements about its longitudinal center line 44 and/or axial adjustment movements relative to its longitudinal center line 44 and/or radial adjustment movements relative to its longitudinal center line 44 and/or tilting movements relative to its longitudinal center line 44, as indicated in FIG. 4 by the various double arrows. In particular, by the operator applying suitably directed activating or adjusting forces relative to the movement setting means 3, for example relative to its gripping section 36, a corresponding relative adjustment can be performed with reference to the respective reference mark 19, 19', 19", which is attached to the respective articulated arm 21, 22, 23. To implement the relative adjustability of the movement setting means 3 or its sensor 16, 17 relative to the respectively selected reference mark 19, 19', 19" by means of the support elements 41 or by means of the support body 43 a plurality of mechanical embodiments are possible.

It is essential that the at least one sensor 16, 17 of the movement setting means 3 can detect the respective relative displacements or adjustments relative to the reference mark 19, 19', 19" to be detected. Such relative adjustments are preferably detectable by an optical or imaging sensor 16 in an optimized and advantageous manner. In particular, if the reference mark 19, 19', 19" is an optically detectable identifier or reference mark, such as for example a graphic pattern in the form of a QR code or the like, relative adjustments or variations can be detected in a simple manner and then converted into corresponding adjustments and control commands for the industrial robot 2. The corresponding conversions of the sensor information of the movement setting means 3 into corresponding adjustments of the industrial robot 2 are preferably performed by the control device 4, 4'. It is advantageous to select the structure of the movement setting means 3 such that in all planned adjustment positions or relative positions at least portions of the respective reference mark 19, 19', 19" can be detected or determined by the at least one sensor 16, 17. It is ensured in this way that the rotary and/or linear relative displacements can be detected by the at least one imaging or distance-sensitive sensor 16, 17 and are converted by the control device 4, 4'—FIG. 1, 2—into corresponding adjustments of the respectively directly contacted and thereby selected articulated arms 21, 22, 23, or are converted alternatively into corresponding adjustments by a plurality of articulated arms 21, 22, 23, provided that for the required or desired adjustments of the industrial robot 2 a plurality of articulated arms 21, 22, 23 have to be adjusted or typically driven by electric motor.

The elasticity of the foot-like support elements 41 or the hollow profile-like support body 43 is preferably selected such that the movement setting means 3 after the cessation of activation or adjusting forces by the operator is returned to its original position or position of rest, in particular in axial alignment or at least approximately centrally relative to the respectively assigned reference mark 19, 19', 19". According to an advantageous embodiment the annular or tubular support body 43 can be designed in the form of a corrugated pipe with a plurality of beads or ribs, which run on the casing surface of the support body 43 in circumferential direction of the casing surface.

The position data, which is received by the at least one sensor 16, 17 of the movement setting means 3 with reference to the reference mark 19, 19', 19", is processed if necessary in the movement setting means 3 and is transmitted via the at least one data interface 11, which as already explained above can be designed to be wired or wireless, to the control device 4, 4' and converted by the latter into corresponding control commands or movements for the industrial robot 2 or the respective articulated arm 21, 22, 23.

As shown schematically in FIG. 4, an articulated arm 21, 22, 23 of an industrial robot 2 comprises a mechanical support structure 45, in particular at least one mechanical arm. For example the articulated arm 21 can be mounted to be angularly adjustable by at least one axis of rotation 46 relative to the adjacent articulated arm 22 or relative to another mechanical component of the industrial robot 2. For the activation and deactivation of said axis of rotation 46 in or on the industrial robot 2—as already known—adjusting motors or other drive elements are provided, such as for example hydraulic positioning cylinders. The support structure 45 of an articulated arm 21, 22, 23 is typically designed to be made of metal, but can also be made of plastic, wherein the respective surface of the support structure 45 possibly comprises friction-increasing areas in order to achieve as far as possible the slip-resistant support of the movement setting means 3 or its contacting and spacing element 33.

In the simplest case the reference marks 19, 19', 19" are formed by stickers with printed identifiers or codes or structures. In this way in a simple manner is it possible to perform a path measurement or establish the relative position between the selected reference mark 19, 19', 19" and the movement setting means 3 and also the temporal shift of the relative position is determined. Alternatively, it is also possible to define the reference marks 19, 19', 19" by geometric structures or elevations or depressions and in this way detect the different relative positions between the movement setting means 3 and reference mark 19, 19', 19". However, it is also possible to use RFID tags to determine relative positions or detect the change of relative positions.

An advantageous property of the said movement setting means 3 is that the latter allows a simple selection of the articulated arms 21, 22, 23, which are to be changed in position or orientation, i.e. pose, by the operator. By means of simple docking or support of the movement setting means 3 and by reading the respective reference mark 19, 19', 19" in a particularly simple, rapid and intuitive manner an adjusting process of the respectively involved articulated arm 21, 22, 23 or a plurality of articulated arms 21, 22, 23 required for the desired adjustment is performed in that the movement setting means 3 is adjusted or moved easily in the desired direction.

For example it is possible that by rotating the movement setting means 3 about its longitudinal center line 44 the movement drive of the articulated arm 21 is activated and then an angular adjustment relative to the axis of rotation 46 is initiated. By means of the particularly simple and practical selection of the respective articulated arm 21, 22, 23 by means of the reference marks 19, 19', 19" attached to the articulated arms 21, 22, 23 the industrial robot 2 can be adjusted very easily and intuitively, without it being necessary to operate complex input means, such as for example a so-called 6D-mouse, a plurality of travel keys or the like.

The mechanical support or the direct contact between the movement setting means 3 and the respectively selected articulated arm 21, 22, 23, which bears the respective reference mark 21, 22, 23, facilitates the operating or control behavior considerably.

It should be noted in particular that as an alternative or in combination with the described attachment of the reference marks 19, 19', 19" onto at least individual articulated arms 21, 22, 23 of the industrial robot 2, it is also possible to attach at least one reference mark 19, 19', 19" onto a workpiece which is to be moved or handled by an industrial robot 2. Thus it is also possible that at least one of the workpieces to be manipulated bears such a reference mark 19, 19', 19" and the movement setting means 3 thus refers to the respective reference mark 19, 19', 19" on the workpiece, so that the workpiece can be moved in space as desired and as required. Once a suitable teaching or programming process has been performed with a sample workpiece and at least one corresponding reference marking 19, 19', 19", the industrial robot 2 can execute the suitably programmed movement sequences automatically in numerous repetition cycles with other, similar workpieces. An alternative possible use involves for example robot-supported production and joining processes, such as those used when assembling vehicles, wherein the joining processes include the operator guiding the respective components using visual control, where the components are held and moved simultaneously by an assembly robot in order to bear their weight and to save the person the effort required of handling the parts.

The measures or processes described above are depicted in the control system 1 and in the movement setting means 3 and can be performed by means of said devices. In particular, the functions and the behaviors of the control system 1 or the movement setting means 3 are determined mostly by software-controlled, electronic components. The corresponding implementation of the measures of the invention by software technology would be familiar to a person skilled in the art and can be performed by using standard electronic components in connection conventional input and output means.

Finally, as a point of formality, it should be noted that for a better understanding of the given control method or the structure of the control system 1 and the movement setting means 3 the latter and its components have not been represented true to scale in part and/or have been enlarged and/or reduced in size.

The problem addressed by the independent solutions according to the invention can be taken from the description.

Mainly the individual measures described in connection with FIG. 1-5 can form the subject matter of independent solutions according to the invention. The related problems and solutions according to the invention can be taken from the detailed descriptions of said figures.

LIST OF REFERENCE NUMERALS

1 control system
2 industrial robot
3 movement setting means
4, 4' control device
5 handheld terminal
6 safety switching device
7 display
8 operating element
9 sensor system
10 sensor system
11 data interface 12 data interface
13 data connection
14 data connection
15 data connection
16 imaging sensor
17 distance-sensitive sensor
18 camera unit
19, 19', 19" reference mark
20 tetrahedron
21 articulated atm
22 articulated arm
23 articulated arm
24 end effector
25 coupling condition
26 fixed connection
27 articulated connection
28 length
29 distance
30 camera
31 camera
32 camera
33 contacting and spacing element
34 coupling rod
35 buffer element
36 gripping section
37 sensor head
38 contact surface
39 evaluation device
40 light source
41 support element
42 contact foot
43 support body
44 longitudinal center line
45 support structure
46 axis of rotation

The invention claimed is:

1. A method for controlling movements of articulated arms of an industrial robot, comprising a movement setting device to be guided by hand by an operator of the industrial robot having the articulated arms,
wherein movements of the movement setting device are provided for generating at least a portion of movement control data for the industrial robot to be controlled, wherein the movement setting device is coupled by data technology to at least one stationary control device and the at least one stationary control device is designed at least for activation and deactivation of movement drives of the industrial robot,
wherein at least on individual articulated arms of the articulated arms adjustable by the operator of the industrial robot having the articulated arms, at least one of a plurality of reference marks is arranged or formed, and
wherein the movement setting device comprises at least one imaging sensor and/or at least one distance-sensitive sensor, which the at least one imaging sensor and/or the at least one distance-sensitive sensor can be set with the at least one of the plurality of reference marks into a relative spatial position selected by the operator of the industrial robot having the articulated arms,
wherein in an initial step using image-based and/or distance-based data from a relative position between the movement setting device and a respectively selected reference mark of the plurality of reference marks, a fixed coupling condition or an articulated coupling condition with specific degrees of freedom is defined or determined, and
wherein in a following step during a movement of the movement setting device at least one articulated arm of the articulated arms bearing the respectively selected reference mark follows the movements of the movement setting device by control technology such that within technical limits of the industrial robot or of the at least one articulated arm of the articulated arms, the coupling condition set in the initial step is adhered to at least approximately.

2. The method as claimed in claim 1,
wherein the at least one articulated arm bearing the respectively selected reference mark is tracked by control technology by using image-based or distance-based data of the at least one imaging or distance-sensitive sensor and/or data from a sensor system integrated into the movement setting device and/or data from an external sensor system,
wherein the relative spatial position or an orientation or change of the relative spatial position or the orientation of the movement setting device is calculated from said image-based or distance-based data and/or the data from the sensor system integrated into the movement setting device and/or the data from the external sensor system.

3. The method as claimed in claim 1, wherein the coupling condition set in the initial step describes a fixed connection between the movement setting device and the at least one articulated arm bearing the selected reference mark.

4. The method as claimed in claim 1,
wherein the coupling condition set in the initial step describes an articulated connection about at least one axis,
wherein an intended joint has a constant relative position to the movement setting device and a constant relative position to the at least one articulated arm bearing the respectively selected reference mark.

5. The method as claimed in claim 1, wherein for degrees of freedom of the robot movement which are not already determined by the coupling condition set in the initial step and the movement of the movement setting device, secondary conditions can be determined automatically or by input of the industrial robot having the articulated arms.

6. The method as claimed in claim 5,
wherein a secondary condition of the secondary conditions is set according to which during tracking an orientation of the at least one articulated arm of the articulated arms bearing the respectively selected reference mark that follows the movements of the movement setting device is maintained in space, or a position of a point in space linked to the at least one articulated arm is kept variable, or
wherein both the position and the orientation of the at least one articulated arm is kept constant.

7. The method as claimed in claim 1, wherein the at least one articulated arm of the articulated arms bearing the respectively selected reference mark is tracked only during or after an enable instruction by the operator of the industrial robot having the articulated arms.

8. The method as claimed in claim 1,
wherein a plurality of respectively distinguishable coded reference marks are provided on different positions on the at least one articulated arm of the articulated arms bearing the respectively selected reference mark or on a plurality of articulated arms of the articulated arms bearing the respectively selected reference mark, wherein the at least one imaging sensor or the at least one distance-sensitive sensor can detect a coding or specific character of the respectively selected reference mark, and wherein the respectively selected reference mark selected by the operator of the industrial robot having the articulated arms and detected or read by the movement setting device is used or is relevant for determining the coupling condition set in the initial step, wherein the operator of the industrial robot having the articulated arms positions the movement setting device such that the respective reference mark is in a detection area of the at least one imaging sensor or the at least one distance-sensitive sensor and the at least one imaging sensor or the at least one distance-sensitive sensor detects the coding or specific character of the respectively selected reference mark by signaling.

9. The method as claimed in claim 8, wherein properties and information are linked by data technology to the coding of the respectively selected reference mark or wherein the coding of the respectively selected reference mark contains corresponding data, relating to an attachment position of the respectively selected reference mark on the industrial robot or relating to the articulated arms or relating to a position on a workpiece held by the industrial robot or relating to a descriptive name of the respectively selected reference mark or relating to an identifier or name of the at least one articulated arm bearing the respectively selected reference mark or relating to additional conditions for setting degrees of freedom not set by the coupling condition set in the initial step for tracking movement of the industrial robot.

10. The method as claimed in claim 1, wherein the operator of the industrial robot having the articulated arms is informed via an output means of the movement setting device when the at least one imaging sensor or the at least one distance-sensitive sensor can actually detect the respectively selected reference mark or when the respectively selected reference mark is within a detection area, or wherein the operator of the industrial robot having the articulated arms is informed via an output means of the movement setting device when the at least one imaging sensor or the at least one distance-sensitive sensor has successfully detected one reference mark of the plurality of reference marks.

11. The method as claimed in claim 1, wherein the operator of the industrial robot having the articulated arms is provided via an output means of the movement setting device with at least portions of properties and information linked by data technology to a reference mark of the plurality of reference marks detected by the at least one imaging sensor or the at least one distance-sensitive sensor or at least portions of the properties and information read from a reference mark of the plurality of reference marks detected by the at least one imaging sensor or the at least one distance-sensitive sensor.

12. The method as claimed in claim 1, wherein the coupling condition set in the initial step is performed by the operator of the industrial robot having the articulated arms moving the movement setting device into a desired relative position to the respectively selected reference mark and by subsequently setting the coupling condition set in the initial step via an input or activation means on the movement setting device.

13. The method as claimed in claim 12, wherein the relative position, from which the coupling condition set in the initial step is determined, is limited by a defined limited distance between the respectively selected reference mark and the movement setting device, or by a direction setting within a specific space segment with reference to the respectively selected reference mark and/or with reference to the movement setting device.

14. The method as claimed in claim 13, wherein the operator of the industrial robot having the articulated arms is informed by an output means on the movement setting device whether a coupling condition set in the initial step is permissible or can be set for an adopted relative position.

15. The method as claimed in claim 1, wherein the at least one imaging sensor is formed on the movement setting device by a camera unit, wherein the camera unit generates image data from the respectively selected reference mark targeted by the camera unit.

16. The method as claimed in claim 1, wherein the at least one distance-sensitive sensor is formed by a short-range distance sensor in the form of an ultrasound sensor, a light-reflection sensor, a magnetic field sensor or an RFID sensor, wherein the at least one distance-sensitive sensor comprises at least three spaced apart individual sensors, which are provided for jointly detecting a respectively selected reference mark.

17. The method as claimed in claim 1, wherein the plurality of reference marks or at least one reference mark of the plurality of reference marks is formed by a 2D marking comprising a barcode, a symbol or a graphic.

18. The method as claimed in claim 1, wherein the plurality of reference marks or at least one reference mark of the plurality of reference marks is formed by a 3D marking comprising a cuboid, a tetrahedron, Cartesian pointer axes, or another 3D object on the industrial robot to be controlled in movement.

19. The method as claimed in claim 1, wherein the movement setting device is rod-shaped and has a length of between 10 cm and 100 cm, wherein the at least one imaging sensor or the at least one distance-sensitive sensor is arranged at an end of the movement setting device facing away from a gripping section of the movement setting device.

20. The method as claimed in claim 1, wherein the movement setting device is designed for the contactless, distance-associated movement coupling relative to the industrial robot or the articulated arms of the industrial robot, wherein a distance between the movement setting device and the industrial robot or an articulated arm of the articulated arms has a value selected from a range between 20 cm and 200 cm.

21. The method as claimed in claim 1, wherein the coupling condition set in the initial step is modelled by computer as a resilient, mechanical connection, and/or wherein for at least one articulated arm of the articulated arms bearing the respectively selected reference mark an influence of inertia and/or friction is modelled by the computer with reference to a subsequently executed movement.

22. The method as claimed in claim 1, wherein the movement setting device comprises at least one contacting and spacing element, which contacting and spacing element contacts an articulated arm of the articulated arms selected by the operator of the industrial robot having the articulated arms during the movement of the industrial robot or the at least one articulated arm of the articulated arms bearing the respectively selected reference mark and with the coupling condition set in the initial step and adhered to by the control technology in a vicinity of the respectively selected reference mark, or alternatively the at least one articulated arm of the articulated arms bearing the respectively selected reference mark is contacted at a suitable position on a surface of the at least one articulated arm, and causes a frictional or positive transmission of force or load-transmitting support between the movement setting device and the at least one articulated arm of the articulated arms bearing the respectively selected reference mark and controlled and moved by the at least one stationary control device, so that the operator of the industrial robot having the articulated arms is given haptic feedback about a robot movement performed by the industrial robot.

23. The method as claimed in claim 1,
wherein the movement setting device has a contacting and spacing element formed by at least two resilient support elements, or by an annular or tubular, resilient support body, by means of which support elements or which support body the at least one distance-sensitive or the at least one imaging sensor can be moved by the operator of the industrial robot having the articulated arms applying an adjusting force into different relative positions relative to the respectively selected reference marking attached to the at least one articulated arm of the articulated arms bearing the respectively selected reference marking,
wherein rotary and/or linear relative displacements of the at least one imaging sensor or the at least one distance-sensitive sensor are detected and converted by the at least one stationary control device into corresponding adjusting movements of the at least one articulated arm of the articulated arms bearing the respectively selected reference marking and mechanically contacted by the contacting and spacing element, or are converted into corresponding adjustment movements of the plurality of articulated arms.

24. A control system for controlling movements of articulated arms of an industrial robot, comprising a movement setting device to be guided by hand by an operator of the industrial robot having the articulated arms,
wherein movements of the movement setting device are provided for generating at least a portion of movement control data for the industrial robot to be controlled,
wherein the movement setting device is coupled by data technology to at least one stationary control device and the at least one stationary control device is designed at least for activation and deactivation of movement drives of the industrial robot,
wherein at least on individual articulated arms of the industrial robot having the articulated arms adjustable by the operator of the industrial robot having the articulated arms, at least one of a plurality of reference marks is arranged or formed, and
wherein the movement setting device comprises at least one imaging sensor and/or at least one distance-sensitive sensor, wherein the at least one imaging sensor and/or the at least one distance-sensitive sensor can be moved into a relative spatial position to at least one of the plurality of reference marks selected by the operator of the industrial robot having the articulated arms,
wherein in an initial step by using image-based and/or distance-based data from the relative position between the movement setting device and a respectively selected reference mark of the plurality of reference marks, a fixed coupling condition or an articulated coupling condition with a specific degree of freedom is defined or determined and
wherein in a following step during a movement of the movement setting device at least one articulated arm of the articulated arms bearing the respectively selected reference mark follows the movements of the movement setting device by control technology such that within technical limits of the industrial robot or of the at least one articulated arm of the articulated arms, the coupling condition set in the initial step is adhered to at least approximately.

25. The control system as claimed in claim 24, wherein the at least one stationary control system is provided and designed for performing a method for controlling the movements of the articulated arms of the industrial robot.

26. A movement setting device for controlling movements of articulated arms of an industrial robot, wherein by a movement setting device to be guided by hand by an operator of the industrial robot having the articulated arms at least a portion of movement control data is generated for the industrial robot to be controlled,
wherein the movement setting device is coupled by data technology to at least one stationary control device and the at least one stationary control device is designed at least for activation and deactivation of movement drives of the industrial robot,
wherein at least on individual articulated arms of the articulated arms adjustable by the operator of the industrial robot having the articulated arms, at least one of a plurality of reference marks is arranged or formed, and
wherein the movement setting device comprises an imaging sensor and/or a distance-sensitive sensor, wherein the imaging sensor and/or the distance-sensitive sensor can be moved into a relative spatial position to at least one of the plurality of reference marks selected by the operator of the industrial robot having the articulated arms,
wherein in an initial step by using image-based and/or distance-based data from a relative position between the movement setting device and the respectively selected reference mark of the plurality of reference marks, a fixed coupling condition or an articulated coupling condition with a specific degree of freedom is defined or determined, and
wherein in a following step during a movement of the movement setting device an at least one articulated arm of the articulated arms bearing the respectively selected reference mark follows the movements of the movement setting device by control technology such that within technical limits of the industrial robot or of the at least one articulated arm of the articulated arms, the coupling condition set in the initial step is adhered to at least approximately.

27. The movement setting device as claimed in claim 26, wherein the movement setting device is provided and designed for performing a method for controlling the movements of the articulated arms of the industrial robot.

* * * * *